(12) United States Patent
Gardner

(10) Patent No.: US 8,858,669 B2
(45) Date of Patent: Oct. 14, 2014

(54) OIL COALESCING FILTER

(75) Inventor: Jeffrey Lynn Gardner, Bessemer City, NC (US)

(73) Assignee: Allied Separation Technology, Inc., Lincolnton, NC (US)

(*) Notice: Subject to any disclaimer, the term of this patent is extended or adjusted under 35 U.S.C. 154(b) by 254 days.

(21) Appl. No.: 13/461,222

(22) Filed: May 1, 2012

(65) Prior Publication Data

US 2013/0291499 A1 Nov. 7, 2013

(51) Int. Cl.
*B01D 59/50* (2006.01)

(52) U.S. Cl.
USPC .......... 55/486; 55/423; 55/482; 55/487; 55/524; 55/527; 95/273; 95/285; 96/108

(58) Field of Classification Search
CPC .... B01D 45/08; B01D 46/10; B01D 39/1623; B01D 2253/102
USPC ............. 55/423, 482, 486–487, 524, 527; 95/273, 285; 96/108
See application file for complete search history.

(56) References Cited

U.S. PATENT DOCUMENTS

| 4,213,307 | A | 7/1980 | Watson |
| 4,648,815 | A | 3/1987 | Williams |
| 5,676,717 | A | 10/1997 | Cope et al. |
| 6,663,341 | B2 | 12/2003 | Evans et al. |
| 6,858,067 | B2 | 2/2005 | Burns et al. |
| 6,872,431 | B2* | 3/2005 | Kahlbaugh et al. .......... 428/36.1 |
| 2001/0017908 | A1 | 8/2001 | Dilick |
| 2003/0178377 | A1 | 9/2003 | Larson |
| 2006/0213162 | A1 | 9/2006 | Jodi |
| 2006/0231644 | A1 | 10/2006 | Breedlove et al. |
| 2009/0050578 | A1* | 2/2009 | Israel et al. ................... 210/767 |
| 2010/0024788 | A1 | 2/2010 | Weber et al. |
| 2010/0092320 | A1 | 4/2010 | Duppert |

* cited by examiner

*Primary Examiner* — Robert Clemente
*Assistant Examiner* — Karla Hawkins
(74) *Attorney, Agent, or Firm* — Jeffrey C. Watson; Balser & Grell IP Law

(57) ABSTRACT

An oil coalescing filter may be used in an oil separator tank with an industrial sized compressor/vacuum package, like a rotary screw compressor/vacuum or a liquid ring compressor/vacuum. The oil coalescing filter has filter media including: a first fiber media adapted for continuously removing oil; and a second fiber media adapted for final oil coalescing; the first fiber media having a greater basis weight than said second fiber media.

16 Claims, 5 Drawing Sheets

OIL COALESCING FILTER

FIELD OF INVENTION

The instant application relates to a coalescing filter that may be used for coalescing processes, like removing oil from an air stream, and more particularly, to an oil coalescing filter for an oil separator tank of an industrial sized compressor/vacuum, like a rotary screw compressor/vacuum or a liquid ring compressor/vacuum.

BACKGROUND OF THE INVENTION

An oil coalescing filter is a device performing coalescence of oil, or a device used to collect oil. Oil coalescing filters are primarily used to separate emulsions into their components via various processes. A coalescer can be divided into mechanical and electrostatic coalescers. Mechanical coalescers use filters or baffles to make droplets coalesce while electrostatic coalescers use DC or AC electric fields (or combinations). The instant invention is directed toward a mechanical coalescer, also known as a coalescing filter. One common use of a coalescing filter is in an industrial sized compressor and/or vacuum, like a rotary screw compressor/vacuum package or a liquid ring compressor/vacuum package.

In the area of compressed air purification, coalescing filters are used to separate liquid water and oil from compressed air using a coalescing effect. These oil coalescing filters may additionally remove particles. Coalescing filters can be used for many purposes in the compressed air field, like in industrial size refrigeration units. As other examples, in the Natural Gas industry, gas/liquid coalescers are used for recovery of lube oil downstream of a compressor, and in the Oil and Gas, Petrochemical and Oil Refining industries, Liquid-Gas coalescers are widely used to remove water and hydrocarbon liquids from natural gas to ensure natural gas quality and protect downstream equipment.

In industrial sized compressors and or vacuums, like a rotary screw compressor/vacuum or a liquid ring compressor/vacuum, the coalescing filter is utilized for removing liquids from the air stream. Liquids from upstream of the compressor, which may include aerosol particles, entrained liquids or large volumes of liquids called "slugs" and which may be water and/or a combination of hydrocarbon liquids are removed by a filter/coalescing vessel located upstream of the compressor. Thus, the coalescing filter provides a means for filtering or cleaning the resulting air stream. However, lube oil recovery is the primary reason for installing a coalescer on the outlet of a compressor/vacuum.

A rotary screw compressor/vacuum package or a liquid ring compressor/vacuum package includes an electric or gas motor to turn a compressor, an oil separator tank/oil sump, air intake filter, oil filter, various piping for moving the compressed air/gas, electrical and pneumatic controls for controlling and monitoring the compressor, and an air or water cooled oil cooler/radiator for cooling the air and oil. Depending on the size of the compressor/vacuum, these units require large volumes of expensive compressor oil for operation. It is vital to the operation of the compressor that the oil separator system is designed to keep oil loss at a minimum.

Along with the air or gas to be compressed, large amounts of compressor oil are injected into the compression chamber. This oil aids in compression, lubricates, and acts as a coolant. After exiting the compression chamber, the hot air-gas/oil mixture flows through a pipe into the separator tank (oil sump) where the oil is removed from the air-gas stream. As the oil laden air/gas mixture flows through the pipe and into the separator tank, large amounts of liquid oil will fall down into the oil sump due to the velocity being reduced to a minimum as it enters the larger vessel. Smaller particles of oil remain mixed in the air-gas stream in the form of light mist. If not removed and allowed to remain in the air-gas stream, this oil mist can quickly deplete the compressor oil to dangerous levels and can damage the compressor/vacuum or environment.

An oil coalescing filter, like the one of the instant invention, is housed within the separator tank, also known as the oil sump. The primary function of the separator element is to trap as much of the remaining oil mist as possible before the air-gas is discharged from the compressor package. To date, the efficiency of the best designs will yield approximately 3-5 parts per million by weight. Depending on the end use requirement, the remaining oil leaving the compressor package is either allowed to proceed downstream to the end user or separated and filtered further using finer filtration stations along the piping system. Consequently, it is highly desired that the coalescing filter remove as much oil and contaminant from the air/gas leaving the compressor package.

While the oil coalescing filter, i.e. the separator element, traps and collects the oil mist, the element must also maintain a low pressure differential, or back pressure on the compressed air or gas. Compressor/vacuum packages are typically recommended to have a pressure differential, or pressure loss, to be in the range of 2-3 pounds per square inch (psi) across newly installed separator elements. High differential pressure results in high power consumption and potential high oil carryover. As such, compressor/vacuum manufactures typically recommend that the oil coalescing filter be changed when pressure differential reaches approximately 10% of the system pressure. As a result, it is also highly desired that the coalescing filter provide as low of pressure differential as possible to increase the efficiency of the package and to extend the life of the filter.

A typical separator filter element is constructed with two stage filtration. The first stage typically consists of a bed of fine fibers to coalesce the oil mist into large droplets. The large droplets are then collected and transported within a bed of larger fibers to a point where the oil will pool up then the liquid will be picked up and recirculated through the compressor package. This final pick up process is referred to as an oil scavenging return system.

The life of the coalescing filter, or separator element, depends on how much contaminate reaches the filter. Contaminate will plug up the fine pores of the larger fiber bed building back pressure until the element reaches the point that change out is required. One problem with current designs of coalescing filters and the filter media used therein, is that it retains all of the oil trapped in the filter and provides no way of releasing the oil once trapped. This results in loss of compressor oil in the system, a build up of pressure differential over time of use in the coalescing filter, and frequent change outs of the coalescing filter. Consequently, it is preferred to provide a coalescing filter that is able to release the oil once trapped to prevent loss of compressor oil in the system, to reduce the build up of pressure differential over time of use in the coalescing filter, and to reduce the change outs of the coalescing filter.

Another problem associated with coalescing filters is static electricity. Oil is conductive and is a carrier of atoms. Thus, the more oil left in the air/gas stream and the more oil stored in the coalescing filter, the more risk of static electricity effecting the package. This can obviously become a dangerous situation and is thus sought to be reduced and/or eliminated.

The instant invention is designed to provide an oil coalescing filter that addresses the problems mentioned above.

SUMMARY OF THE INVENTION

The instant invention includes an oil coalescing filter for an oil separator tank used with an industrial sized compressor/vacuum package, like a rotary screw compressor/vacuum or a liquid ring compressor/vacuum. The oil coalescing filter has filter media including: a first fiber media adapted for continuously removing oil; and a second fiber media adapted for final oil coalescing; the first fiber media having a greater basis weight than the second fiber media.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

DETAILED DESCRIPTION OF THE INVENTION

Figure 1:
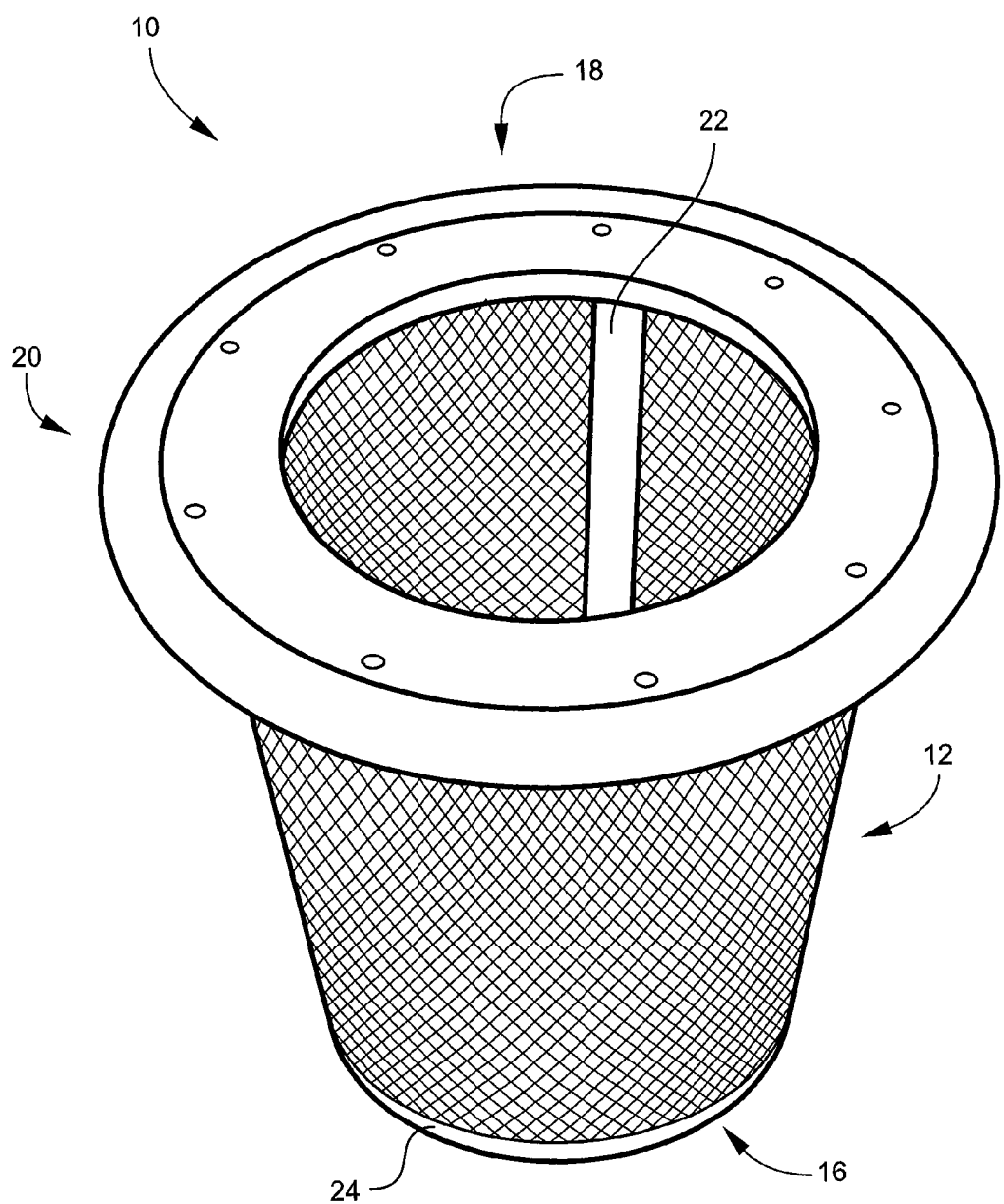
FIG. 1 is a perspective view of one embodiment of an oil coalescing filter according to the instant invention.

Referring to the drawings, wherein like numerals indicate like elements, there is shown in FIG. 1 an embodiment of a coalescing filter 10. Coalescing filter 10 may be an oil coalescing filter for performing coalescence of oil, or a device used to collect oil. However, coalescing filter 10 is not so limited and may be used for other filtering, coalescing, or separation applications. For example, coalescing filter 10 may be used to separate emulsions into their components via various other processes, whether known or later discovered. In general, coalescing filter 10 may be used for any need to remove a hydrocarbon from a gas/air/fluid stream.

Coalescing filter 10 may be used in an industrial sized compressor and/or vacuum package 26. See FIGS. 2-3. Industrial sized compressor and/or vacuum package 26 may be any compressor and/or vacuum package, including, but not limited to, a rotary screw compressor/vacuum or a liquid ring compressor/vacuum. Coalescing filter 10 may be used to separate liquid water and oil from compressed air using a coalescing effect. Coalescing filter 10 may additionally remove particles. Coalescing filter 10 can be used for many purposes in the compressed air field, like in industrial size refrigeration units. As other examples, in the Natural Gas industry, coalescing filter 10 may be used for recovery of lube oil downstream of a compressor, and in the Oil and Gas, Petrochemical and Oil Refining industries, Liquid-Gas coalescing filter 10 may be used to remove water and hydrocarbon liquids to <0.011 ppmw (plus particulate matter to <0.3 um in size) from natural gas to ensure natural gas quality and protect downstream equipment.

Figure 2:
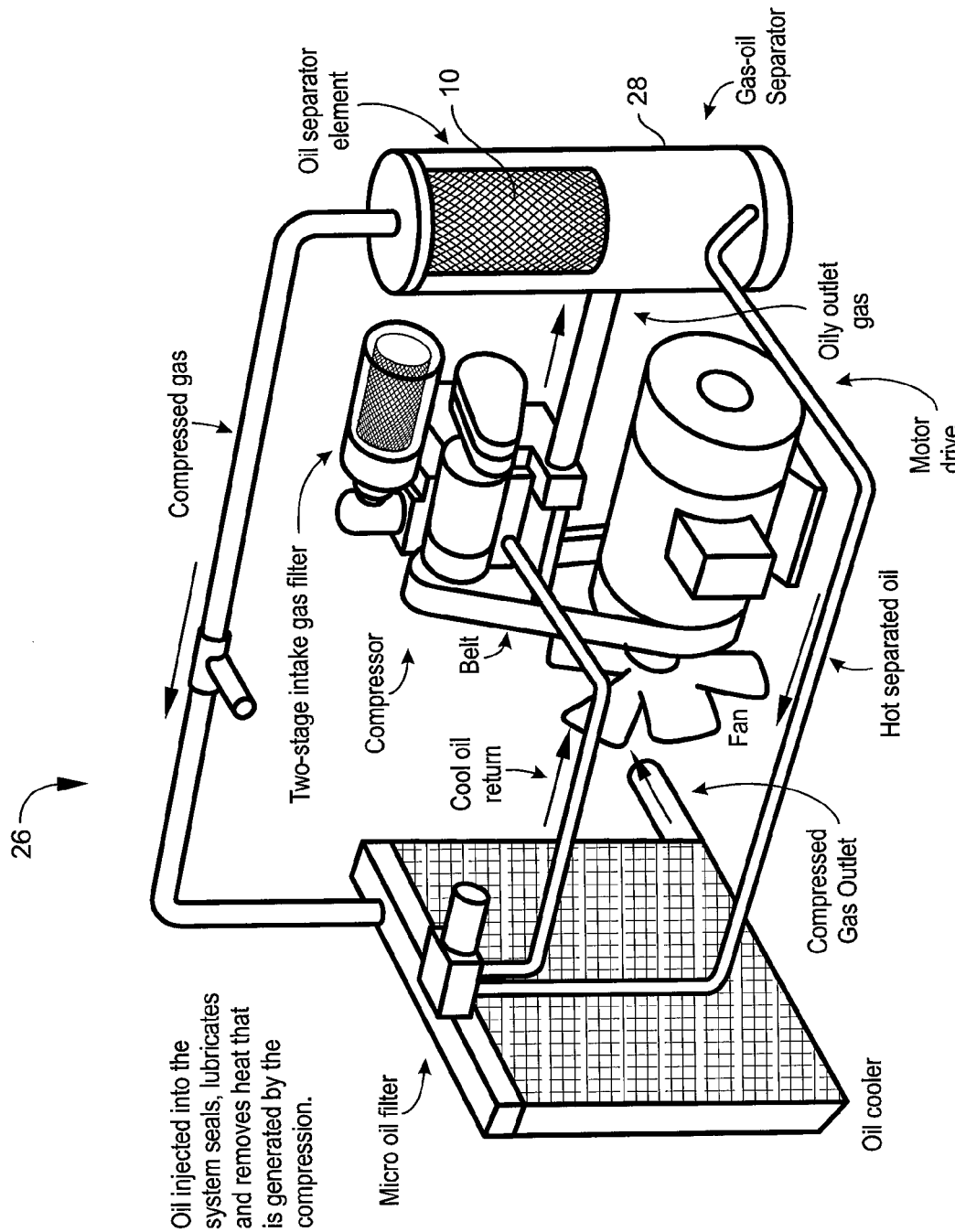
FIG. 2 is a perspective view of an industrial sized compressor/vacuum package with one embodiment of an oil coalescing filter according to the instant invention utilized in the oil separator tank.
Figure 3:
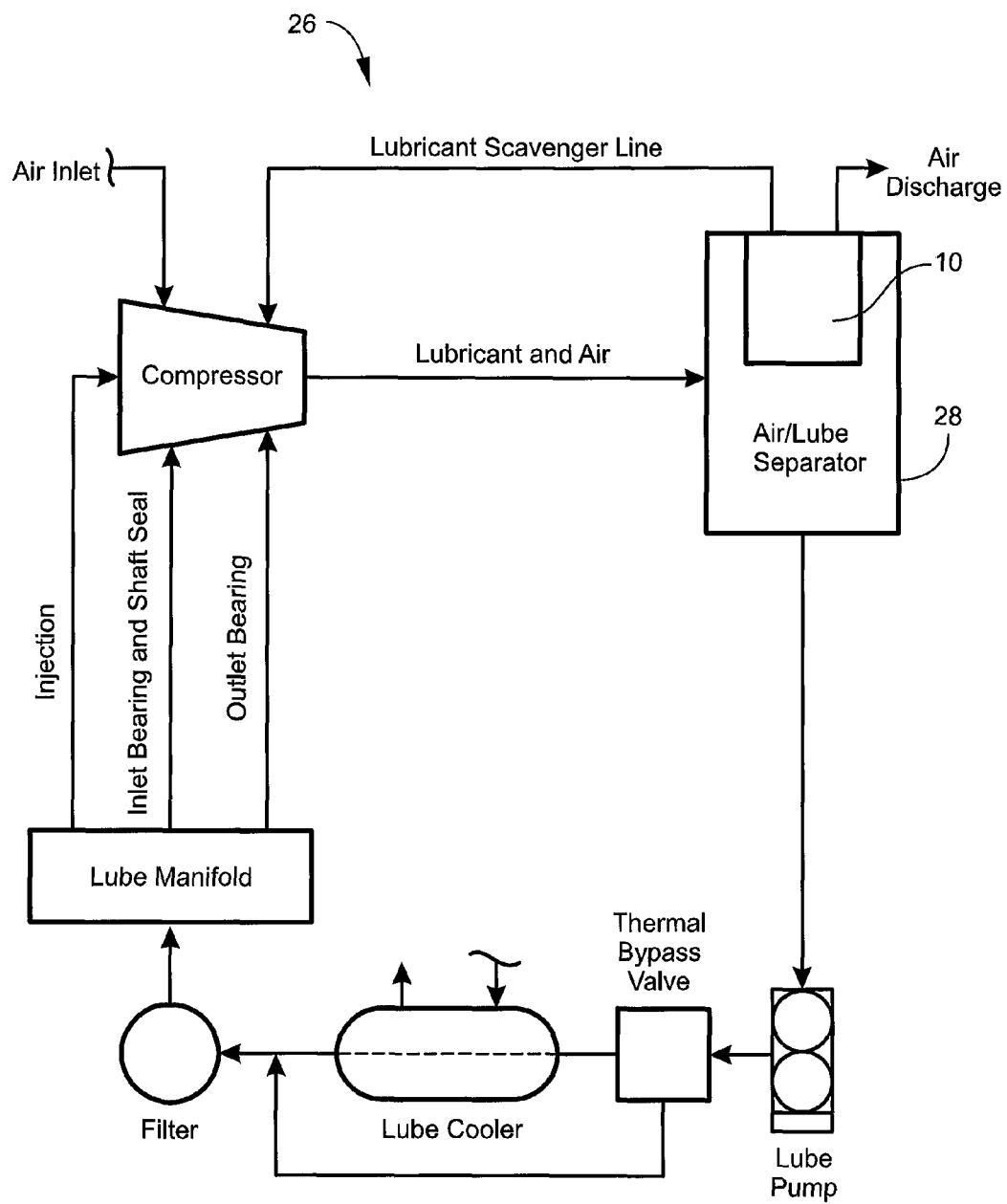
FIG. 3 is a schematic diagram of the industrial compressor/vacuum package shown in FIG. 2.

Referring to FIGS. 2 and 3, in the industrial sized compressor/vacuum package 26, the coalescing filter 10 may be utilized for removing liquids and/or for lube oil recovery on the outlet of the compressor/vacuum. Liquids from upstream of the compressor/vacuum package 26, which may include aerosol particles, entrained liquids or large volumes of liquids called "slugs" and which may be water and/or a combination of hydrocarbon liquids are removed by coalescing filter 10 located upstream of the compressor. The compressor/vacuum package 26, like a rotary screw or a liquid ring compressor/vacuum package, may include an electric or gas motor to turn a compressor, an oil separator tank/oil sump 28, air intake filter, oil filter, various piping for moving the compressed air/gas, electrical and pneumatic controls for controlling and monitoring the compressor, and an air or water cooled oil cooler/radiator for cooling the air and oil. Along with the air or gas to be compressed, large amounts of compressor oil may be injected into the compression chamber. This oil may aid in compression, lubricates, and may act as a coolant. After exiting the compression chamber, the hot air-gas/oil mixture may flow through a pipe into the separator tank (oil sump) 28 where the oil is removed from the air-gas stream. As the oil laden air/gas mixture flows through the pipe and into the separator tank 28, large amounts of liquid oil may fall down into the oil sump due to the velocity being reduced to a minimum as it enters the larger vessel. Smaller particles of oil may remain mixed in the air-gas stream in the form of light mist. This light mist may typically be in the range of 500-2000 parts per million by weight. If not removed and allowed to remain in the air-gas stream, this oil mist may quickly deplete the compressor oil to dangerous levels and may damage the compressor/vacuum or environment. Oil coalescing filter 10 may be housed within the separator tank 28, also known as the oil sump. The primary function of the oil coalescing filter 10 may be to trap as much of the remaining oil mist as possible before the air-gas is discharged from the compressor package 26.

Oil coalescing filter 10 may be sized and/or configured to fit any sized compressor/vacuum package 26, or any other separation, filtration, coalescence application. As examples, oil coalescing filter 10 may be installed in the air receiver tank of rotary screw, vane style, and/or refrigeration compressors. A wide variety of filter element designs may be provided that can include conventional or high efficiency pleated models (for requirements of below 3 pm oil carryover), in vertical and horizontal mounting. For example, but not limited to, airflow capacities may be provided by oil coalescing filter 10 which expose 3000 cfm. Oil coalescing filter 10 may be designed to retrofit the most popular compressed air, coalescing dryer prefilter and afterfilter, instrumentation and mist eliminator filter housings. The dimensions and configurations of oil coalescing filter 10 may allow the user to install it directly into existing devices without any kits or modifications.

Referring to FIG. 1, one embodiment of oil coalescing filter 10 is shown. In this embodiment, oil coalescing filter 10 may generally include a top 18 with a flange 20, a bottom 16, and filter media 12 in between the top 18 and bottom 16.

The filter media 12 may be included in oil coalescing filter 10. Filter media 12 may be for providing the main coalescing in filter 10. Filter media 12 may perform coalescence of oil from an air/gas stream. Filter media 12 may allow the oil from the air/gas stream to be filtered and collected. Filter media 12 may include a first fiber media 38 and a second fiber media 40. See FIG. 5. The first fiber media may have a greater basis weight than the second fiber media.

Figure 5:
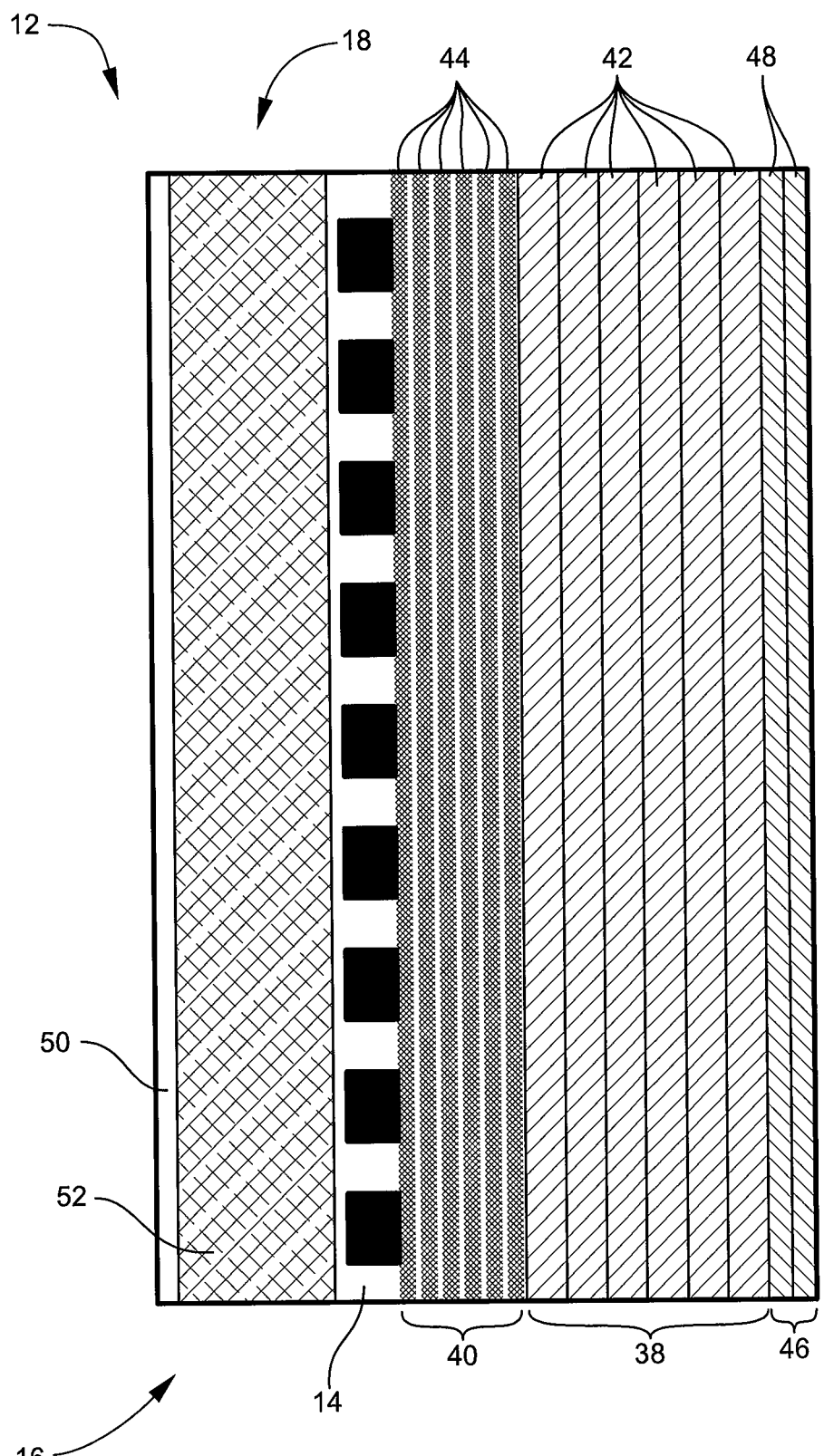
FIG. 5 is a cross-sectional view of one embodiment of the filter media used in the oil coalescing filter according to the instant invention.

First fiber media 38 may be included in the filter media 12 of oil coalescing filter 10. See FIG. 5. First fiber media 38 may be for continuously removing oil. First fiber media 38 may be any media adapted for continuously removing oil in oil coalescing filter 10. In one embodiment, first fiber media 38 may include at least one layer of a first lofted fiberglass material 42. The first lofted fiberglass material 42 may be any lofted fiberglass material. In one embodiment, first lofted fiberglass material 42 may have a basis weight between 5 and 50 g/ft$^2$. In another embodiment, first lofted fiberglass material 42 may have a basis weight of between 10 and 35 g/ft$^2$. In yet another embodiment, the first lofted fiberglass material 42 may have a basis weight of approximately 18.9 g/ft$^2$. First lofted fiberglass material 42 may have fibers with a greater diameter or size than the second lofted fiberglass material 44, and thus, may have a higher basis weight than second lofted fiberglass material 44. First fiber media 38 may include any amount of layers of fibers like first lofted fiberglass material 42. In one embodiment, first fiber media 38 may include between 1 and 20 layers of the first lofted fiberglass material 42. In another embodiment, first fiber media 38 may include between 2 and 10 layers of the first lofted fiberglass material 42. In yet another embodiment, the first fiber media 38 may comprise 6 layers of the first lofted fiberglass material 42 (as shown in FIG. 5). The first lofted fiberglass material 42 may optionally include a first backing. The first backing may be for providing structure to first lofted fiberglass material 42. The first backing may be any backing material, including, but not limited to, a fiberglass backing, a 0.5 osy polyester backing, or a 0.5 osy nylon backing. The first lofted fiberglass material 42 may have any or all of the following properties: an initial thickness (uncompressed) of approximately 0.50 inches; a pressure drop of approximately 0.11 W.G. as measured at an air velocity of 25 ft./min. through a 2 ft.×2 ft. flat sheet; an initial flat sheet particle efficiency of approximately 22% at an air velocity of 25 ft./min. through a 2 ft.×2 ft. flat sheet in the 0.3-0.5 micron particle size; and/or a void volume of approximately 0.4969 in$^3$. An example material suitable for first lofted fiberglass material 42 may be provided by Johns Manville of Denver, Colo. under the trade name Delta-Aire™ Filtration Media G.P. ½" (Unbacked, B1, or B2).

Second fiber media 40 may be included in the filter media 12 of oil coalescing filter 10. See FIG. 5. Second fiber media 40 may be for final oil coalescing. Second fiber media 40 may be any media adapted for final oil coalescing in oil coalescing filter 10. In one embodiment, second fiber media 40 may include at least one layer of a second lofted fiberglass material 44. Second lofted fiberglass material 44 may be any lofted fiberglass material. In one embodiment, second lofted fiberglass material 44 may have a basis weight between 0.5 and 30 g/ft$^2$. In another embodiment, second lofted fiberglass material 44 may have a basis weight of between 1 and 20 g/ft$^2$. In yet another embodiment, second lofted fiberglass material 44 may have a basis weight of approximately 11.0 g/ft$^2$. Second lofted fiberglass material 44 may have fibers with a smaller diameter than first lofted fiberglass material 42, and as such, may have a lower basis weight than first lofted fiberglass material 42. The second lofted fiber media 40 may include any amount of layers of second lofted fiberglass material 44. In one embodiment, second lofted fiber media 40 may include between 1 and 20 layers of second lofted fiberglass material 44. In another embodiment, the second lofted fiber media 40 may include between 2 and 10 layers of the second lofted fiberglass material 44. In another embodiment, the second lofted fiber media 40 may include 6 layers of the second lofted fiberglass material 44 (as shown in FIG. 5). The second lofted fiberglass material 44 may optionally include a second backing. The second backing may be for providing structure to second lofted fiberglass material 44. The second backing may be any backing material, including, but not limited to, a nonwoven fabric. The second lofted fiberglass material 44 may have any or all of the following properties: an initial thickness (uncompressed) of approximately 0.25 inches; a pressure drop of approximately 0.26 inches W.G. as measured at a velocity of 35 ft./min. through a 1 ft. by 1 ft. flat sheet; and/or a void volume of approximately 0.2484 in$^3$. An example material suitable for second lofted fiberglass material 44 may be provided by UPF Corporation of Bakersfield, Calif. under the product name Ultracore Filtration Media UFM—85 B2.

An outer scrim media 46 may also be included in the filter media 12 of oil coalescing filter 10. See FIG. 5. Outer scrim media 46 may be adapted for removing particles prior to entering first fiber media 38 and/or second fiber media 40. For example, in one embodiment, outer scrim media 46 may be adapted for removing particles with a size greater than 10 microns. In one embodiment, outer scrim media 46 may include at least one layer of a scrim material 48. Scrim material 48 may be any scrim material adapted for removing particles. In one embodiment, scrim material 48 may be a nonwoven material. The nonwoven material of scrim material 48 may be any type of nonwoven material. In one embodiment, the nonwoven material of scrim material 48 may be a spunbonded nonwoven. This spunbonded nonwoven could be made of any material, including, but not limited to, polyester. In one embodiment, the scrim material 48 may be a polyester spunbonded nonwoven having any or all of the following properties: an initial thickness (uncompressed) of approximately 8.6 mils; a basis weight of approximately 4.0 osy; a mullen burst of approximately 51 psi; and an air permeability of approximately 215 ft$^3$/min/ft$^2$. Outer scrim media 46 may include any amount of layers of scrim material 48. In one embodiment, outer scrim media 46 may include 2 layers of scrim material 48. An example material suitable for scrim material 48 may be provided by Snow Filtration of West Chester, Ohio under the part number REEMAY 2040.

Figure 4:
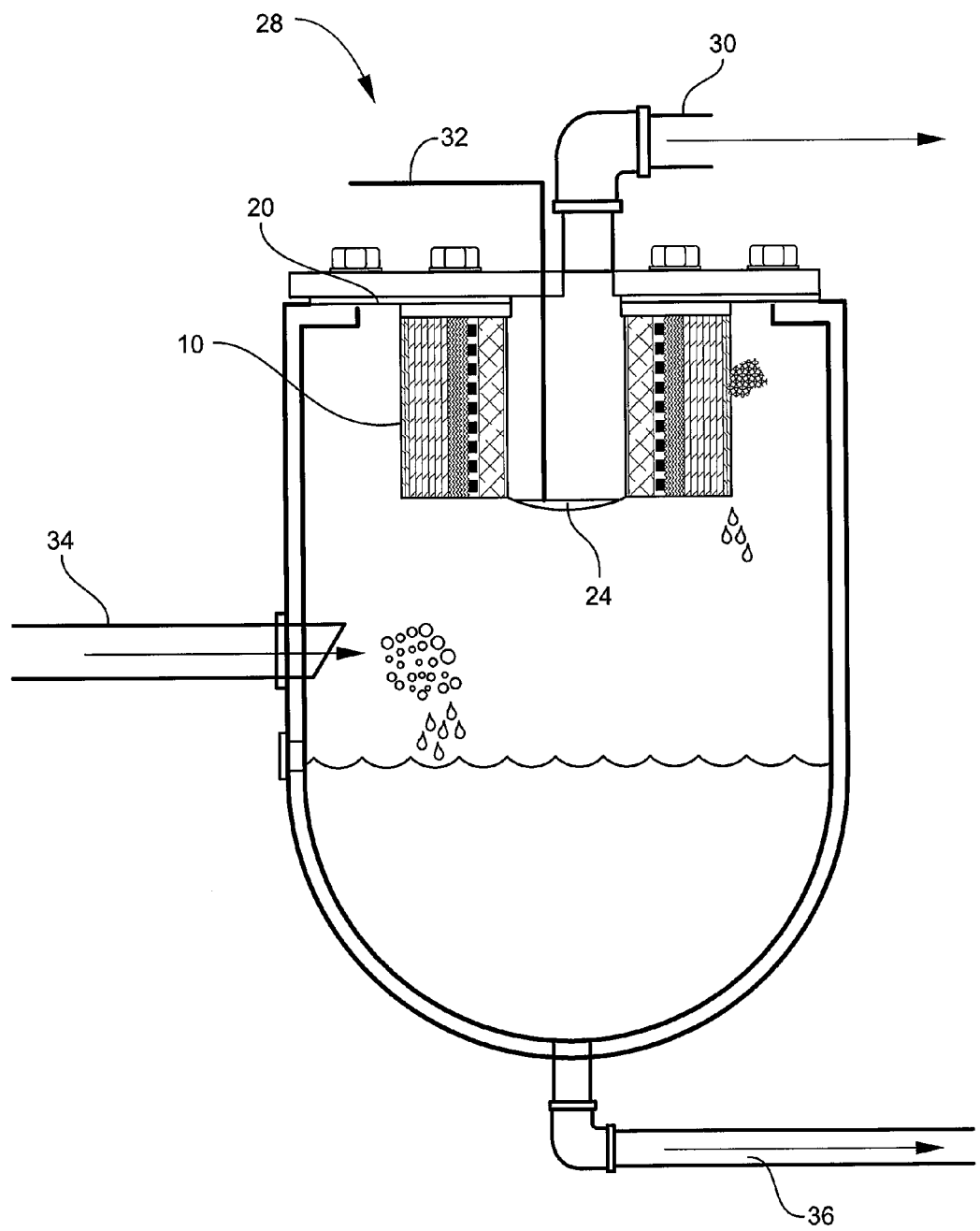
FIG. 4 is a cross-sectional view of an oil separator tank including one embodiment of an oil coalescing filter according to the instant invention.

In the various embodiments shown in FIGS. 1, 4 and 5, the oil coalescing filter 10, may further include: an inner support tube 50, a drain media 52, a perforated metal support tube 14, a flange 20 at the top 18, an insert 22, and a end cap 24. The inner support tube 50 (see FIG. 5) may be any inner support tube, including being made out of any material, like a metal inner support tube. The drain media 52 may be around inner support tube 50. The drain media 52 may be any material for providing drainage, including, but not limited to, being a polyester material. The perforated metal support tube 14 may be around the drain media 52. The second lofted fiber media 40, the first lofted fiber media 38, and the outer scrim media 46 may be wrapped around the perforated metal support tube 14. The flange 20 may be at the top 18 of oil coalescing filter 10 and may be sized and configured to fit and lock onto the top of any opening, like the opening inside a oil separator tank 28 (see FIG. 4). Flange 20 and top 18 may include a plurality of holes for securing coalescing filter 10 to an opening. The insert 22 may be inserted inside inner metal support tube 50 and may include end cap 24 at the bottom 16 of oil coalescing filter 10. The end cap 24 may be for collecting fluid on the inside of inner metal support tube 50 that has drained down from filter media 12. The fluid collected in end cap 24 may be recirculated through the system via scavenger line 32.

Referring to FIG. 4, an oil separator tank 28 for a rotary screw compressor/vacuum or a liquid ring compressor/vacuum may be provided with the oil coalescing filter 10 of the instant invention. In addition to the oil coalescing filter 10, as described above, the oil separator tank 28 may include an oil/gas mixture inlet 34 where the oil/gas mixture is pumped into the oil separator tank 28. Once the oil/gas mixture enters the tank, due to the decrease in velocity, the majority of the oil will fall to the bottom of the tank where the oil can exit the tank via the bulk oil exit 36. The remaining gas may include smaller particles of oil in the form of light mist. This light mist may typically be in the range of 500-2000 parts per million by weight. This mist may enter oil coalescing filter 10 through outer scrim media 46, travel through first fiber media 38, second fiber media 40, perforated support tube 14, drain media 52 and through inner support tube 50 into the center of filter 10. As the mist travels through the various layers of filter media 12 within oil coalescing filter 10, the oil mist may be separated from the air/gas/fluid stream and coalesced. The majority of the oil that is coalesced will flow down through the first fiber media 38 and out of the bottom of oil coalescing filter 10 and into the bulk oil exit 36. This is the process of continuous oil removal of first fiber media 38. In addition, the oil may also flow down through the second fiber media 40, and/or the drain media 52. The oil mist that enters the inside of inner support tube 50 may also collect at the bottom of filter 10 into end cap 24, where a scavenger line 32 may collect the oil and recirculated it back into the system. The remaining air/gas stream can then flow out of the oil separator tank 28 through air discharge 30.

Referring to the embodiments shown in FIGS. 4 and 5, the oil coalescing filter 10 is configured to have air flow from the outside circumference (via oil/gas mixture inlet 34) of the filter into the filter media 12 and out of the inside of the filter (via air discharge 30). However, the invention is not so limited and can be configured to have the opposite air flow, i.e. air flow from the inside of the filter (via air discharge 30) through the filter media 12 and out of the outside circumference of the filter (via oil/gas mixture inlet 34). An embodiment of oil coalescing filter 10 may be provided with the configuration for this type of flow. In this configuration, the oil coalescing filter 10 may generally have the filter media 12 reversed. For example, the outer scrim media 46 may be wrapped around support tube 50, the first fiber media 38 may be wrapped around the outer scrim media 46, the second fiber media 40 may be wrapped around the first fiber media 38, the drain media 52 may be wrapped around the second fiber media 40, and then the perforated support tube 14 may be positioned around the second drain media 52.

In operation, the oil coalescing filter 10 of the instant invention, by way of filter media 12, as described above, may be inserted into oil coalescing filter 10 where it may be used in an oil separator tank 28 of a compressor/vacuum package 26, like a rotary screw compressor/vacuum or a liquid ring compressor/vacuum. The filter media 12, by first providing an outer scrim media 46 may first remove particles, like particles over 10 microns. Next, by way of first fiber media 38, the oil coalescing filter 10 may provide a layer or layers of material adapted for continuously removing oil. In this area of the filter, the oil may be continuously removed from the oil and allowed to flow downwards out of the bottom 16 of the filter element where it may fall into the oil sump or be picked up by scavenger line 32 for recirculation through the system. This first fiber media provides the primary coalescing of the oil from the air/gas stream. Next, by way of second fiber media 40, the final oil coalescing step is provided in oil coalescing filter 10. Second fiber media 40, by having smaller fibers than the first fiber media 38, may collect the remaining small particles of oil mist in the air/gas stream before it exits the system.

The results of the combination of elements provided in filter media 12, may allow oil coalescing filter 10 to be capable of providing an improved compressor oil carryover and an improved pressure drop over previous oil coalescing filters. In one embodiment, oil coalescing filter 10 may provide a compressor oil carryover of less than 5 parts per million. In another embodiment, oil coalescing filter 10 may provide a compressor oil carryover of less than 2 parts per million. In yet another embodiment, oil coalescing filter 10 may provide a compressor oil carryover of approximately 0.8 parts per million. In one embodiment, oil coalescing filter 10 may provide a pressure drop of less than 10 psi. In another embodiment, oil coalescing filter 10 may provide a pressure drop of less than 5 psi. In yet another embodiment, oil coalescing filter 10 may provide a pressure drop of approximately 2-3 psi or less. In one embodiment, oil coalescing filter may provide a compressor oil carryover of less than approximately 2 parts per million or less with a pressure drop of approximately 2-3 psi or less.

In addition to the above advantages of reduced compressor oil carryover and reduced pressure drop, the instant invention of an oil coalescing filter also provides numerous other advantages over the known coalescing filters. These advantages are discussed below:

The oil coalescing filter 10 of the instant invention by way of filter media 12 gathers and re-directs oil mist within the first fiber media 38 thereby reducing the oil challenge to the final coalescing section in second fiber media 40. As the compressor air/oil mist enters the cylindrical separator element the strategic arrangements of media simultaneously coalesces and channels the coalesced oil to a low wet band section of the separator element. The coalesced oil is hydraulically forced through the lower section of the element leaving the upper sections free to coalesce the remaining low level mist remaining in the air stream. This bulk oil is picked up by the scavenge line then retuned to the lubrication system of the compressor/vacuum package.

The filter media 12 of the instant invention also provides an oil coalescing filter that requires less power to operate via lower element differential pressure under load. Low level oil challenge reduces the amount of saturation to the media thereby lowering the differential across the element.

The oil coalescing filter 10 of the instant invention by way of filter media 12 also provides quick oil drainage that reduces the differential upon compressor reloading. During the unloading cycle of the compressor, the oil embedded in the element is allowed to drain back into the oil sump so during the next loading sequence, the separator media is not saturated with oil. This process means the separator element operates under lower pressure differential, meaning the compressor amp draw is less.

The oil coalescing filter 10 of the instant invention, by way of filter media 12, may also reduce the potential for static electricity. By minimizing the carrier of atoms in the contaminated oil, the instant invention reduces the potential for static electricity.

The oil coalescing filter 10 of the instant invention, by way of filter media 12, may also extend the life of the filter by directing the contaminate oil to the wet section and oil scavenge pick up tube. This may allow for more time between filter changes resulting in less time and money for filter changes. In addition, this may allow oil coalescing filter 10 to be installed on poorly maintained compressors.

The oil coalescing filter 10 of the instant invention, by way of filter media 12, may also be installed in a natural gas compressor where coal fines prematurely plug the separator element media. With filter media 12, the media arrangement allows filtration through the compressor filter system.

The oil coalescing filter 10 of the instant invention, by way of filter media 12, may also, in the event that the intake filter fails and contaminate is injected into the compressor intake, the filter media 12 may direct the contaminated oil to the wet band or drainage upstream into the compressor oil filter system.

The oil coalescing filter 10 of the instant invention, by way of filter media 12, may also release the oil with the compressor unloads. The oil coalescing filter 10 of the instant invention, by way of filter media 12, may also utilize the forces of gravity and large fibers to remove the coalesced oil from the filter 10. Thus the instant invention does not require and eliminates the need for hydraulic or pneumatic force to move and remove the coalesced oil.

EXAMPLE

An oil coalescing filter was created according to the instant invention. The filter media used included an outer scrim media 46, a first fiber media 38, and a second fiber media 40. The outer scrim media 46 included 2 layers of a spunbonded polyester nonwoven provided by Snow Filtration of West Chester, Ohio under the part number REEMAY 2040. The first fiber media 38 included 6 layers of a first lofted fiberglass material 42 provided by Johns Manville of Denver, Colo. under the trade name Delta-Aire™ Filtration Media G.P. ½" (B2) with a 0.5 osy polyester backing. The second fiber media 40 included 6 layers of a second lofted fiberglass material 44 provided by UPF Corporation of Bakersfield, Calif. under the product name Ultracore Filtration Media UFM—85 B2. The filter media 12 was inserted into an oil coalescing filter 10 as shown and described herein. The oil coalescing filter 10 was then inserted into a rotary screw compressor package for testing.

The results of the test on this configuration of filter media 12 provided an oil coalescing filter capable of providing a compressor oil carryover at approximately 0.8 parts per million at a pressure drop of approximately 2-3 psi or less. In addition, the oil coalescing filter was tested for an extended period of time. Due to the continuous oil coalescing in the first stage and the ability to allow that oil to drain, the pressure drop remained relatively constant throughout the extended period of time resulting in a filter that may last much longer than previous oil coalescing filters. Furthermore, during the unloading cycle of the compressor, the oil that was embedded in the element drained back into the oil sump so that the oil coalescing filter 10 was not saturated with oil on the next compression loading cycle. This resulted in a more efficient compressor package.

The instant invention may be embodied in other forms without departing from the spirit and the essential attributes thereof, and, accordingly, reference should be made to the appended claims, rather than to the foregoing specification, as indicated in the scope of the invention.

I claim:

1. An oil coalescing filter with a filter media comprising:
a first fiber media for continuously removing oil comprising at least one layer of a first lofted fiberglass material, said first lofted fiberglass material having a basis weight between 5 and 50 g/ft$^2$; and
a second fiber media for final oil coalescing comprising at least one layer of a second lofted fiberglass material, said second lofted fiberglass material having a basis weight between 0.5 and 30 g/ft$^2$, wherein said first lofted fiberglass material having a basis weight greater than the basis weight of said second lofted fiberglass material; said first fiber media may having a greater basis weight than said second fiber media;
wherein, said oil coalescing filter in an oil separator tank for a rotary screw compressor/vacuum or a liquid ring compressor/vacuum, whereby said oil coalescing filter being capable of providing a compressor oil carryover of approximately 2 parts per million or less with a pressure drop of approximately 2-3 psi or less.

2. The filter media of claim 1 wherein: said first lofted fiberglass material having a basis weight of between 10 and 35 g/ft$^2$; and said second lofted fiberglass material having a basis weight of between 1 and 20 g/ft$^2$.

3. The filter media of claim 1 wherein: said first lofted fiberglass material having a basis weight of approximately 18.9 g/ft$^2$; and said second lofted fiberglass material having a basis weight of approximately 11.0 g/ft$^2$.

4. The filter media of claim 1 wherein: said first fiber media comprising between 1 and 20 layers of said first lofted fiberglass material; and said second fiber media comprising between 1 and 20 layers of said second lofted fiberglass material.

5. The filter media of claim 1 wherein: said first fiber media comprising between 2 and 10 layers of said first lofted fiberglass material; and said second fiber media comprising between 2 and 10 layers of said second lofted fiberglass material.

6. The filter media of claim 1 wherein: said first fiber media comprising 6 layers of said first lofted fiberglass material; and said second fiber media comprising 6 layers of said second lofted fiberglass material.

7. The filter media of claim 1 wherein: said first lofted fiberglass material having a first backing; and said second lofted fiberglass material having a second backing.

8. The filter media of claim 7 wherein: said first backing being a fiberglass backing, a 0.5 osy polyester backing, or a 0.5 osy nylon backing; and said second backing being a non-woven fabric.

9. The filter media of claim 1 wherein: said first lofted fiberglass material having: an initial thickness of approximately 0.50 inches; a pressure drop of approximately 0.11 W.G. as measured at an air velocity of 25 ft./min. through a 2 ft×2 ft. flat sheet; an initial flat sheet particle efficiency of approximately 22% at an air velocity of 25 ft./min. through a 2 ft×2 ft. flat sheet in the 0.3-0.5 micron particle size; and a void volume of approximately 0.4969 in$^3$; and said second lofted fiberglass material having: an initial thickness of approximately 0.25 inches; a pressure drop of approximately 0.26 inches W.G. as measured at a velocity of 35 ft./min. through a 1 ft. by 1 ft. flat sheet; and a void volume of approximately 0.2484 in$^3$.

10. The filter media of claim 1 further comprising an outer scrim media adapted for removing particles with a size greater than 10 microns, said outer scrim media comprising at least one layer of a scrim material.

11. The filter media of claim 10 wherein said scrim material being a nonwoven material, said nonwoven material being a spundonded polyester having: a thickness of approximately 8.6 mils; a basis weight of approximately 4.0 osy; a mullen burst of approximately 51 psi; and an air permeability of approximately 215 ft$^3$/min/ft$^2$.

12. The filter media of claim 10 wherein said outer scrim media comprising 2 layers of said scrim material.

13. An oil coalescing filter for of an oil separator tank for rotary screw compressors/vacuums or liquid ring compressors/vacuums including a filter media, said oil coalescing filter comprising:

a first fiber media for continuously removing oil comprising at least one layer of a first lofted fiberglass material, said first lofted fiberglass material having a basis weight between 5 and 50 g/ft$^2$; and a second fiber media for final oil coalescing comprising at least one layer of a second lofted fiberglass material, said second lofted fiberglass material having a basis weight between 0.5 and 30 g/ft$^2$, wherein said first lofted fiberglass material having a basis weight greater than the basis weight of said second lofted fiberglass material;

said first fiber media may having a greater basis weight than said second fiber media;

wherein, said oil coalescing filter in an oil separator tank for a rotary screw compressor/vacuum or a liquid ring compressor/vacuum, whereby said oil coalescing filter being capable of providing a compressor oil carryover of approximately 2 parts per million or less with a pressure drop of approximately 2-3 psi or less.

14. The oil coalescing filter of claim 13 further comprising an outer scrim media adapted for removing particles with a size greater than 10 microns.

15. The oil coalescing filter of claim 13 further comprising: an inner support tube, said inner support tube being metal; a drain media around said inner metal support tube, said drain media being a polyester material; a perforated metal support tube around said drain media; said second lofted fiber media, said first lofted fiber media, and said outer scrim media being wrapped around said perforated metal support tube; a top having a flange; a bottom; and an insert having a end cap at said bottom for collecting fluid on the inside of said perforated metal support tube.

16. An oil separator tank for a rotary screw compressor/vacuum or a liquid ring compressor/vacuum comprising:

an oil coalescing filter having filter media comprising:

a first fiber media for continuously removing oil comprising at least one layer of a first lofted fiberglass material, said first lofted fiberglass material having a basis weight between 5 and 50 g/ft$^2$; and a second fiber media for final oil coalescing comprising at least one layer of a second lofted fiberglass material, said second lofted fiberglass material having a basis weight between 0.5 and 30 g/ft$^2$, wherein said first lofted fiberglass material having a basis weight greater than the basis weight of said second lofted fiberglass material;

said first fiber media may having a greater basis weight than said second fiber media;

wherein, said oil coalescing filter in an oil separator tank for a rotary screw compressor/vacuum or a liquid ring compressor/vacuum, whereby said oil coalescing filter being capable of providing a compressor oil carryover of approximately 2 parts per million or less with a pressure drop of approximately 2-3 psi or less.

\* \* \* \* \*